(12) United States Patent
Kobayashi

(10) Patent No.: US 6,275,267 B1
(45) Date of Patent: Aug. 14, 2001

(54) TELEVISION RECEIVER FOR RECEIVING A PLURALITY OF FORMATS OF VIDEO SIGNALS HAVING DIFFERENT RESOLUTIONS

(75) Inventor: Satoshi Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/343,386

(22) Filed: Jun. 30, 1999

(30) Foreign Application Priority Data

Jul. 2, 1998 (JP) .................................................. 10-187234

(51) Int. Cl.⁷ .......................... H04N 5/46; H04N 5/445; H04N 9/74
(52) U.S. Cl. ......................... 348/555; 348/556; 348/558; 348/563; 348/569; 348/589
(58) Field of Search ..................................... 348/555, 556, 348/558, 563, 564, 567, 568, 569, 589, 600; H04N 5/46, 5/445, 9/74

(56) References Cited

U.S. PATENT DOCUMENTS 6,175,388 * 1/2001 Knox ..................................... 348/569

* cited by examiner

*Primary Examiner*—Sherrie Hsia
(74) *Attorney, Agent, or Firm*—Frommer Lawrence & Haug, LLP.; William S. Frommer

(57) ABSTRACT

Display source memories of resolutions according to image formats are prepared. The image format is discriminated from an extracted video packet. A font or a bit map is read out from the display source memory corresponding to the image format. The font or bit map corresponding to the image format is developed in an OSD plane memory and synthesized to a video signal by a mixing circuit. Thus, a character or a bit map picture plane of similar quality and size can be always seen irrespective of the received image format.

6 Claims, 9 Drawing Sheets

Fig. 2 (PRIOR ART)
| # | VERTICAL RESOLUTION | HORIZONTAL RESOLUTION | RESOLUTION ASPECT RATIO | SCANNING SYSTEM | DISPLAY ASPECT |
|---|---|---|---|---|---|
| 1 | 1080 DOTS | 1920 DOTS | 16 : 9 | INTERLACE | 16 : 9 |
| 2 | 1080 DOTS | 1440 DOTS | 16 : 9 | INTERLACE | 16 : 9 |
| 3 | 720 DOTS | 1280 DOTS | 16 : 9 | INTERLACE | 16 : 9 |
| 4 | 480 DOTS | 720 DOTS | 13.5 : 9 | INTERLACE | 16 : 9 |
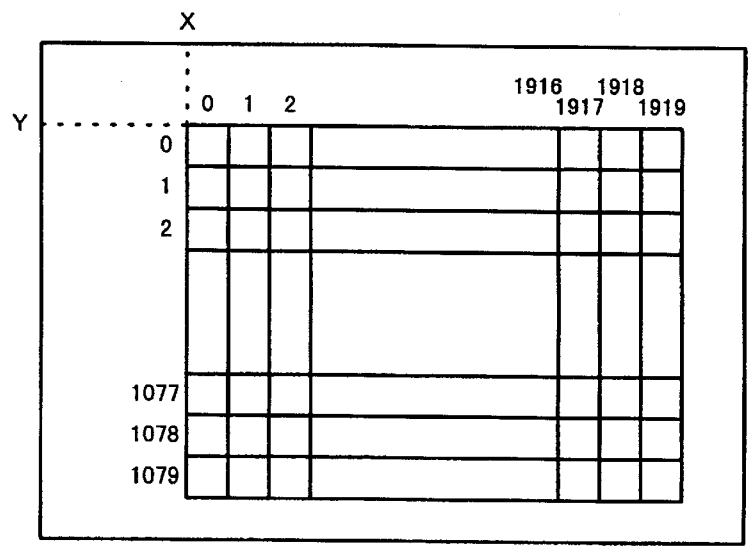
Fig. 3A (PRIOR ART)
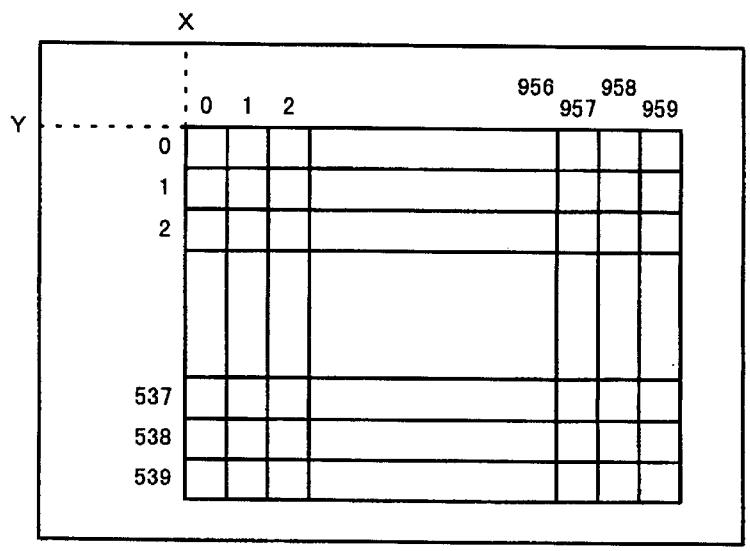
Fig. 3B (PRIOR ART)

| MIXING STEP | α | 1−α | DIGITAL VIDEO SIGNAL RATIO | OSD PASTERN DATA RATIO |
|---|---|---|---|---|
| 1 | 1.0 | 0 | 100% | 0% |
| 2 | 0.75 | 0.25 | 75% | 25% |
| 3 | 0.5 | 0.5 | 50% | 50% |
| 4 | 0.25 | 0.75 | 25% | 75% |
| 5 | 0 | 1.0 | 0% | 100% |

Fig. 7 (PRIOR ART)

| # | VIDEO VERTICAL RESOLUTION | VIDEO HORIZONTAL RESOLUTION | OSD PLANE VERTICAL READING RATE | OSD PLANE HORIZONTAL READING RATE | OSD RANGE FOR VIDEO IMAGE |
|---|---|---|---|---|---|
| 1 | 1080 DOTS | 1920 DOTS | 1/2 | 1/2 | VERTICAL 960 × LATERAL 1280 |
| 2 | 1080 DOTS | 1440 DOTS | 1/2 | 1/2 | VERTICAL 960 × LATERAL 1280 |
| 3 | 720 DOTS | 1280 DOTS | 1/1 | 1/2 | VERTICAL 480 × LATERAL 1280 |
| 4 | 480 DOTS | 720 DOTS | 1/1 | 1/1 | VERTICAL 480 × LATERAL 940 |

TELEVISION RECEIVER FOR RECEIVING A PLURALITY OF FORMATS OF VIDEO SIGNALS HAVING DIFFERENT RESOLUTIONS

BACKGROUND OF THE INVENTION

1. Field of the Invention

The invention relates to a television receiver for receiving a digital television broadcasting which is sent by using a ground wave or a satellite. More particularly, the invention relates to an apparatus for performing various on-screen display on a screen of a television receiver.

2. Description of the Related Art

A satellite digital television broadcasting for broadcasting a digital video signal by using a satellite has been started. The development of a ground wave digital television broadcasting for broadcasting a digital video signal by using a ground wave is being progressed. In the digital television broadcasting, it is expected to provide various services such as high definition television (HDTV) broadcasting, a multichannel broadcasting, multimedia broadcasting, and the like.

FIG. 1 shows an example of a construction of a conventional digital television receiver. In such a receiver, for instance, a digital video signal is compressed by an MPEG (Moving Picture Experts Group) 2 system and a digital television broadcasting which is broadcasted by a ground wave is received.

According to the MPEG2 system, a video signal is compression encoded by a motion compensation predictive coding and a DCT (Discrete Cosine Transform). In the MPEG2 system, three kinds of picture planes called an I (Intra) picture, a P (Predictive) picture, and a B (Bidirectionally Predictive) picture are sent. In the I picture, a DCT coding is performed by using the pixels of the same frame. In the P picture, the DCT coding using the motion compensation prediction is performed with reference to the I picture or P picture which has already been encoded. In the B picture, the DCT coding using the motion compensation prediction is performed with reference to the I picture or P picture before or after the B picture.

In such a digital television broadcasting, there is a possibility that video signals of a plurality of picture planes of different formats are sent. For example, as an image format having a possibility that a video signal is sent by a digital television broadcasting, as shown in FIG. 2, there are image formats as shown in #1 to #4. As shown in FIG. 2, according to the image format #1, a vertical resolution is equal to 1080 dots, a horizontal resolution is equal to 1920 dots, a resolution aspect ratio is equal to 16:9, and an interlace system is used. According to the image format #2, a vertical resolution is equal to 1080 dots, a horizontal resolution is equal to 1440 dots, a resolution aspect ratio is equal to 16:9, and an interlace system is used. According to the image format #3, a vertical resolution is equal to 720 dots, a horizontal resolution is equal to 1280 dots, a resolution aspect ratio is equal to 16:9, and a noninterlace system is used. According to the image format #4, a vertical resolution is equal to 480 dots, a horizontal resolution is equal to 720 dots, a resolution aspect ratio is equal to 13.5:9, and a noninterlace system is used.

In FIG. 1, the digital television broadcasting signal is received by an antenna 111. The reception signal from the antenna 111 is sent to a tuner circuit 112. A channel set signal is supplied from a microprocessor 101 to the tuner circuit 112.

The microprocessor 101 controls a processing system of a whole television receiver. A program ROM 102 to store a program for deciding the operation and a work RAM 103 are provided for the microprocessor 101. A bus 5 led out from the microprocessor 101 is connected to a block of each section.

In the tuner circuit 112, a reception channel is set on the basis of the channel set signal from the microprocessor 101. In the tuner circuit 112, the signal of the selected reception channel is demodulated and a data stream of MPEG2 of the selected channel is outputted from the tuner circuit 112.

An output of the tuner circuit 112 is supplied to a packet extracting circuit 113. Under the control of the microprocessor 101, the packet extracting circuit 113 extracts a video packet and an audio packet of a specific program with reference to a packet identifier (PID) of a packet header.

The video packet from the packet extracting circuit 113 is supplied to a video decoding circuit 114. The audio packet from the packet extracting circuit 113 is supplied to an audio decoding circuit 115.

The video decoding circuit 114 decompresses the video signal compressed by the MPEG2 system and decodes the digital video signal. Component digital video signals of, for example, Y, Cr, and Cb are outputted from the video decoding circuit 114. The component digital video signals are supplied to a mixing circuit 116.

To display the reception channel, a decoding state, and the like into a video picture plane, the mixing circuit 116 mixes the video signal and an OSD (On Screen Display) signal. For the purpose of such a picture plane display, a display source memory 117, a display image forming circuit 118, and an OSD plane memory 119 are prepared.

Patterns of characters and images serving as sources of display picture planes have been held in the display source memory 117. An output of the display source memory 117 is supplied to the display image forming circuit 118. The display image forming circuit 118 forms a display image by using a display source from the display source memory 117. The formed display image is developed into the OSD plane memory 119 and held. The received video signal and the OSD signal from the OSD plane memory 119 are mixed in the mixing circuit 116.

The OSD plane memory 119 stores data of a whole OSD display image to be mixed and displayed onto the video display image. For example, in case of the image format #1, a display image is stored in the memory by a construction of vertical 1080 dots×lateral 1920 dots as shown in FIG. 3A.

Since the display image constructed in the OSD plane memory 119 is mixed with the video data at a timing of a dot clock of the video data by the mixing circuit 116, its aspect size is set to the same size as that of the video display image or a size that is a fraction of an integer with respect to the vertical and lateral directions in order to reduce the memory size. FIG. 3B shows a case where the aspect size is set to ½ in both of the vertical and lateral directions.

As for the order to read out the display image data from the OSD plane memory 119 to the OSD, it is read out in accordance with the same scanning order as that of the digital video signal. As a scanning order here, there are a noninterlace and an interlace in a manner similar to the video signal.

At the time of the noninterlace display, as shown in FIG. 4A, the video signal is read out while scanning pixel data from the left to the right and from the top to the bottom. In the reading operation in the horizontal direction, a dot clock itself of the video signal or a clock obtained by frequency dividing the clock is used. In the vertical direction, at the time of the interlace display, as shown in FIG. 4B, the video signal is first outputted while scanning the pixel data of even lines from the left to the right and from the top to the bottom. Subsequently, the video signal is outputted while scanning the pixel data of odd lines from the left to the right and from the top to the bottom.

In FIG. 1, a mixture ratio of the video signal and the OSD signal in the mixing circuit 116 is set by the microprocessor 101 by setting a mixture ratio of the digital video signal from the video decoding circuit 114 and the display image data of the OSD from the OSD plane memory 119 to a value α of 1 or less. As for the mixture ratio, a case of mixing at five steps as shown in, for example, FIG. 5 is considered. In case of a ratio of 100:0 or 0:100, it seems as if they were switched instead of the mixture.

The function to mix by changing the mixture ratio as mentioned above is realized by a circuit as shown in FIG. 6. In FIG. 6, the digital video signal from the video decoding circuit 114 is multiplied by the value α of a mixture ratio register 153 by an integrator 151 and the resultant signal is inputted to an adder 154. The display image data of the OSD is multiplied by a value (1−α) from the mixture ratio register 153 by an integrator 152 and the resultant signal is inputted to the adder 154. The adder 154 adds the inputs of the integrators 151 and 152 and generates a digital video signal to which the OSD display image data has been mixed. In this case, by changing the value α of the mixture ratio register, the mixture ratio can be arbitrarily set.

In FIG. 1, an analog converter 120 converts the digital video signal formed by the mixing circuit 116 into an analog value. Usually, an A/D converter having a precision of 8 bits or 10 bits for each signal of the RGB signal format or the (Y, Cr, Cb) signal format is used.

An output of the mixing circuit 116 is supplied to the analog converter 120. The analog converter 120 converts the digital video signal into an analog video signal. The analog video signal is outputted from an output terminal 121.

The audio packet from the packet extracting circuit 113 is sent to the audio decoding circuit 115. In the audio decoding circuit 115, the audio packet is converted into a digital audio signal. The digital audio signal has a precision of 16 bits or more. An output of the audio decoding circuit 115 is supplied to an analog converter 122. In the analog converter 122, the digital audio signal is converted into an analog audio signal. The analog audio signal is outputted from an output terminal 123.

As mentioned above, in the television receiver for receiving the digital television broadcasting, to display the reception channel, decoding state, and the like into the video picture plane, the video signal and the OSD signal are mixed, and the display of the reception channel, decoding state, and the like is superimposed and displayed on the screen. As mentioned above, when displaying on the screen, a command to display a predetermined picture plane and a command regarding the display position are issued from the microprocessor 101 to the display image forming circuit 118. A command to set a mixture ratio of a video picture plane and a display picture plane is issued from the microprocessor 101 to the mixing circuit 116.

The display image forming circuit 118 forms a display picture plane by using a source of the display source memory 117 in accordance with the designated display image. In this instance, the microprocessor 101 processes each processing operation in accordance with a procedure stored in the program ROM 102, stores the work data in the process into the RAM 103, and executes a series of processes.

As shown in FIG. 2, in the digital television broadcasting, there is a possibility that video signals of a plurality of picture planes of different formats are transmitted. Although there are a plurality of formats of the picture planes which are sent as mentioned above, the number of display patterns in the display source memory 117 is equal to 1 in the conventional television receiver. There is, consequently, a problem that an additional display picture plane to be synthesized is distorted in dependence on the format of the received picture plane.

That is, when there is one display memory 117, to make it possible to use the OSD plane memory 119 in common, in the case where the video data of the image format using a video image of high resolution is mixed to the OSD display image, as shown in FIG. 7, a reading rate from the OSD plane memory 119 is changed in accordance with the video data.

For example, in the display image forming circuit 118, as shown in FIG. 8, a character font of vertical 24 dots×lateral 24 dots is combined with bit map data of lateral 600 dots×vertical 200 dots, thereby forming an OSD display image of lateral 640 dots×vertical 480 dots as a whole.

In case of using the OSD display image in common for the image format #1, as shown in FIG. 7, a reading rate from the OSD plane memory 119 is set to ½ in both of the vertical direction and the horizontal direction. In case of using the OSD display image in common for the image format #2, a reading rate from the OSD plane memory 119 is set to ½ in both of the vertical direction and the horizontal direction. In case of using the OSD display image in common for the image format #3, a reading rate from the OSD plane memory 119 is set to ½ in only the horizontal direction. In case of using the OSD display image in common for the image format #4, a reading rate from the OSD plane memory 119 is not changed.

With the above method, as shown in FIG. 8, when the pattern drawn on the foregoing bit map data is mixed to the video image of the format #4 and is displayed, if such a pattern has been designed so as to be seen like a true circle, in the case where it is mixed to the video images of the formats #1, #2, and #3, cover range of the OSD image for the video image and the aspect ratio of the OSD image when moving onto the television picture plane of the aspect ratio of 16:9 differ. The circle seen as a true circle cannot be seen like a true circle.

FIG. 9 shows an example in which the OSD image of lateral 640 dots×vertical 480 dots is converted so that the OSD image of lateral 1280 dots×vertical 960 dots is seemingly derived by reducing the reading rate into ½ in both of the vertical and lateral directions and the converted OSD image is mixed to the video data of the image format #1. For the video image, the range of the OSD image is narrowed, the aspect ratio of the OSD image changes for the video image, and the circle which is desired to be seen like a true circle is seen as a longitudinal circle.

FIG. 10 shows an example in which the OSD image of lateral 640 dots×vertical 480 dots is converted so that the OSD image of lateral 1280 dots×vertical 960 dots is seemingly derived by reducing the reading rate into ½ in both of the vertical and horizontal directions and the converted OSD image is mixed to the video data of the image format #2. For the video image, the range of the OSD image is slightly narrowed, the aspect ratio of the OSD image slightly changes for the video image, and the circle which is desired to be seen like a true circle is seen as a slightly distorted circle.

FIG. 11 shows an example in which the OSD image of lateral 640 dots×vertical 480 dots is converted so that the OSD image of lateral 1280 dots×vertical 480 dots is seemingly derived by reducing the reading rate into ½ in the horizontal direction and the converted OSD image is mixed to the video data of the image format #3. For the video image, the range of the OSD image in the vertical direction is narrowed, the aspect ratio of the OSD image changes for the video image, and the circle which is desired to be seen like a true circle is seen as a laterally long circle. It will be obviously understood that a point that the aspect ratio of the bit image changes depending on the display video format as mentioned above fundamentally similarly occurs even in the portion of a character font constructed by a bit map in a narrow region.

Even if the reading rate from the OSD plane memory is changed and is used in common for the image format to draw the OSD image data as much as possible as mentioned above, the cover range of the OSD image for the video image changes, the aspect ratio of the display of the OSD image changes, and information to be notified to the user via the OSD image is distorted. The display quality of the OSD image changes depending on each video format and an additional value as a digital television is deteriorated.

OBJECTS AND SUMMARY OF THE INVENTION

It is, therefore, an object of the invention to provide a television receiver in which even when video signals of image formats of different resolutions are received, an OSD picture plane of a similar quality can be obtained and it is possible to prevent a display aspect ratio of an OSD image from changing and the OSD image from being distorted.

According to the invention, the above object is accomplished by a television receiver for receiving a plurality of formats of video signals having different resolutions, comprising:

resolution discriminating means for discriminating a resolution of the received video signal;

a source memory in which a plurality of display patterns of additional video image constructed by characters and/or figures have been recorded by an amount of the corresponding plural video signal formats;

display image forming means for reading out the display pattern in the (display) source memory, constructing a display image, and transferring the display image to a display memory; and a mixing circuit for mixing the display image read out from the display memory and the received video signal, wherein one of display pattern of the corresponding resolution is selected from the source memory in accordance with the resolution of the received video signal determined by the resolution discriminating means, a display image is constructed from the selected display pattern, the display image is superimposed onto the received video signal, and a resultant image is displayed.

According to the invention, there is also provided a television receiver for receiving video signals of a plurality of formats of different aspect ratios of images, comprising:

discriminating means for discriminating the format of the received video signal;

a source memory in which display patterns of additional video images constructed by characters or. figures have been recorded by an amount corresponding to a plurality of patterns at aspect ratios corresponding to the video signals of the plurality of formats of the different aspect ratios;

display image forming means for reading out one of the display patterns in the source memory, constructing a display image, and transferring the display image to a display memory; and a mixing circuit for synthesizing the display image read out from the display memory and the received or inputted video signal on a picture plane, wherein a corresponding one of the plurality of display patterns is selected in accordance with the aspect ratio of the video signal determined by the discriminating means, a display image is constructed from the selected display pattern, the display image is synthesized with the received or inputted video signal, and a resultant image is displayed.

The display source memory of the resolution according to the image format is prepared. The image format is determined from the extracted video packet. The font or bit map in the display source memory corresponding to the image format is read out and displayed. Thus, the characters or bit map picture plane of a similar quality and a similar size can be always seen irrespective of the received image format.

As a display source memory, a plurality of display patterns prepared for every different resolutions or aspect ratios can be recorded in different addresses of a common source memory.

The above and other objects and features of the present invention will become apparent from the following detailed description and the appended claims with reference to the accompanying drawings.

BRIEF DESCRIPTION OF THE DRAWINGS

FIG. 2 is a schematic diagram for use in explanation of an image format;

FIGS. 3A and 3B are schematic diagrams for use in explanation of storage of OSD display data;

FIG. 7 is a schematic diagram for use in explanation of reading of a plane memory;

DETAILED DESCRIPTION OF THE PREFERRED EMBODIMENT

Figure 1:
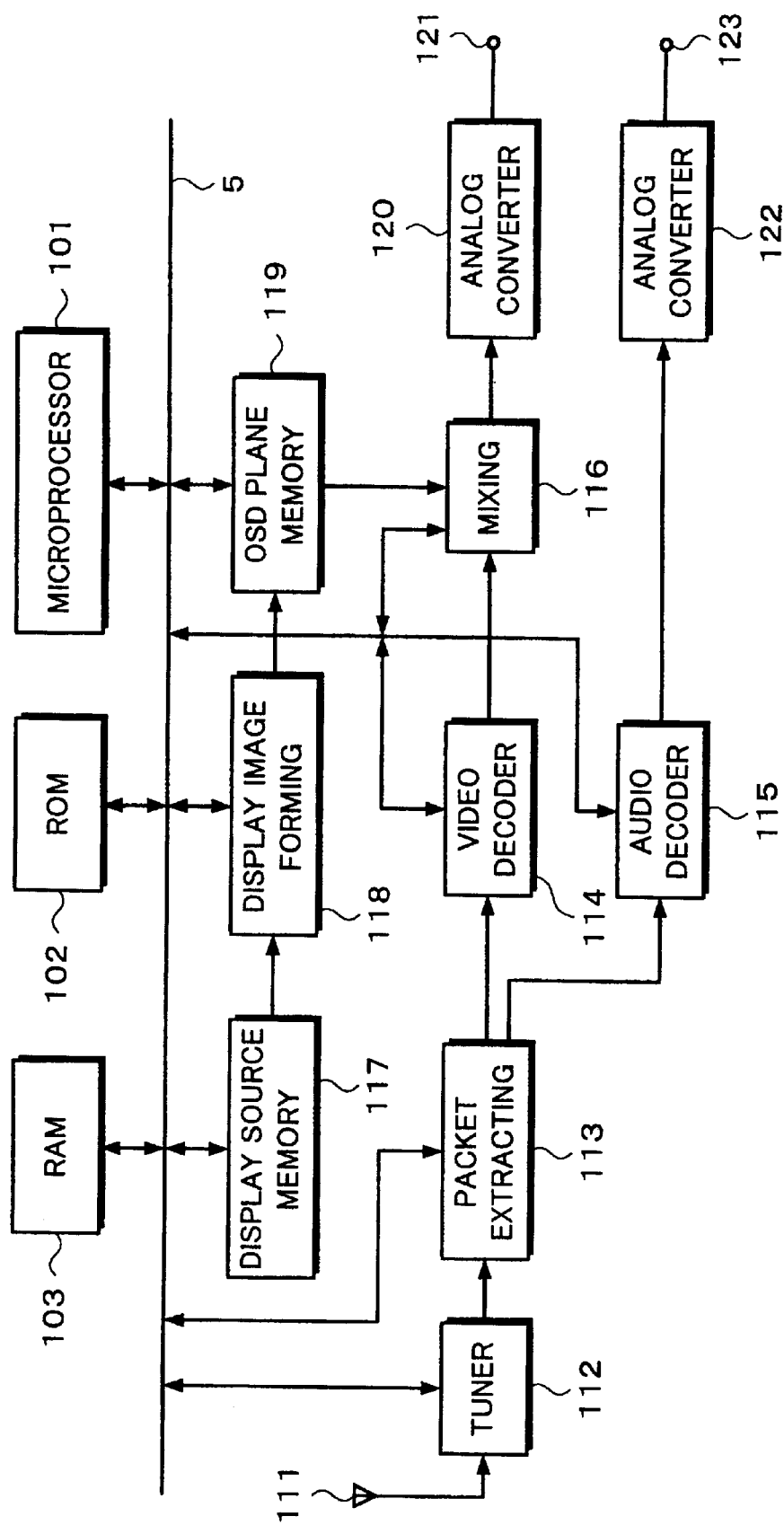
FIG. 1 is a block diagram showing an example of a construction of a television receiver of a conventional digital broadcasting.
Figure 4A:
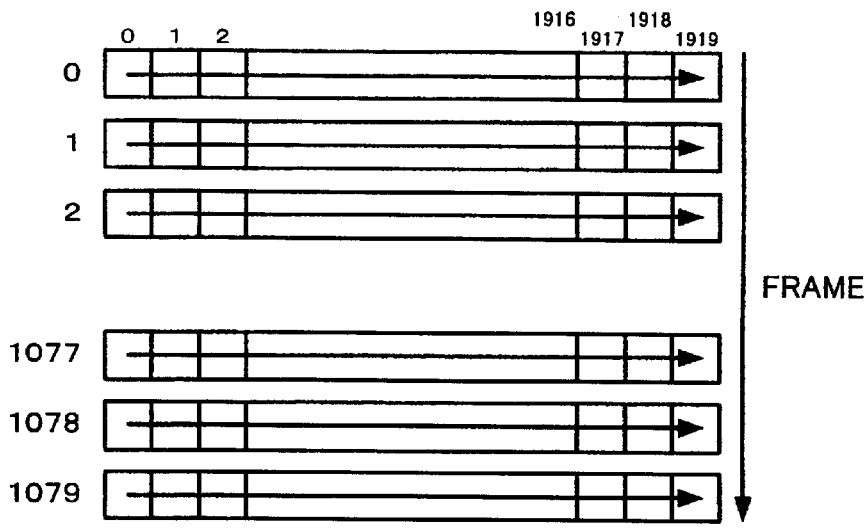
FIGS. 4A and 4B are schematic diagrams for use in explanation of reading of OSD patterns.
Figure 4B:
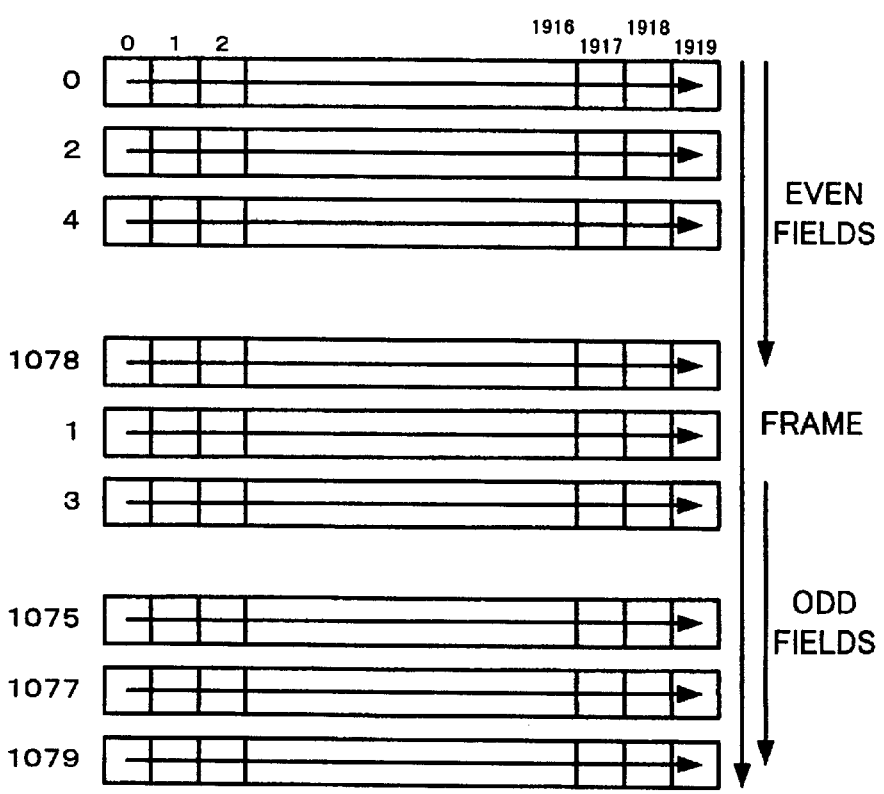
Figures 5, 6:
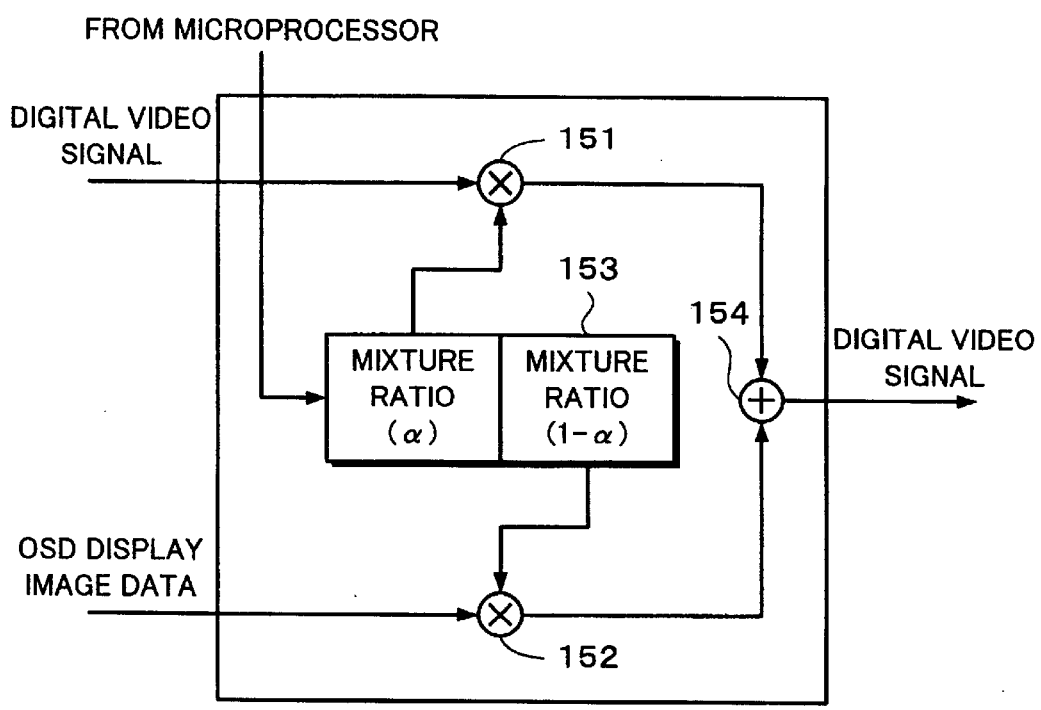
FIG. 5 is a schematic diagram for use in explanation of a mixture ratio of a video signal and an OSD signal.
FIG. 6 is a block diagram of an example of a mixing circuit of the video signal and the OSD signal.
Figure 8:
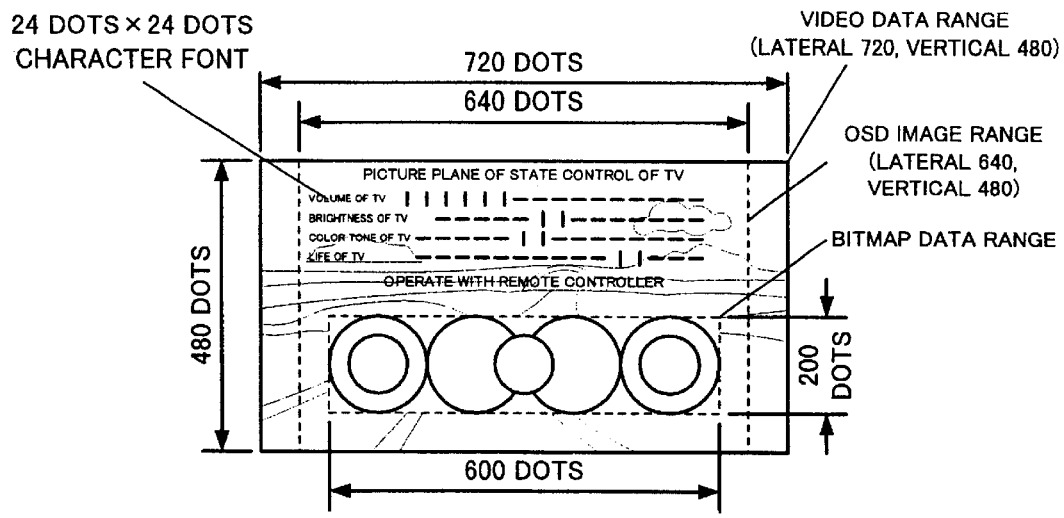
FIG. 8 is a schematic diagram for use in explanation of an OSD picture plane.
Figure 9:
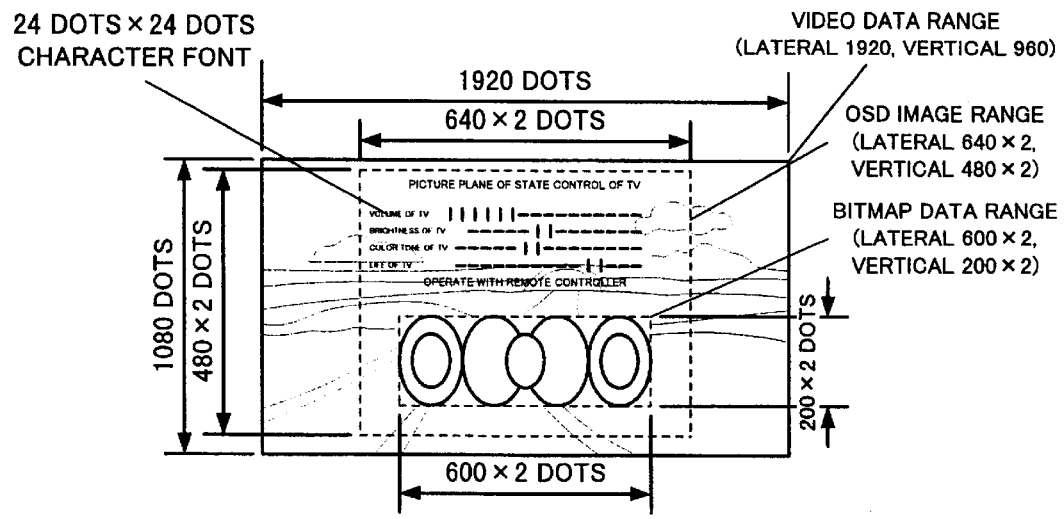
FIG. 9 is a schematic diagram for use in explanation of an OSD picture plane.
Figure 10:
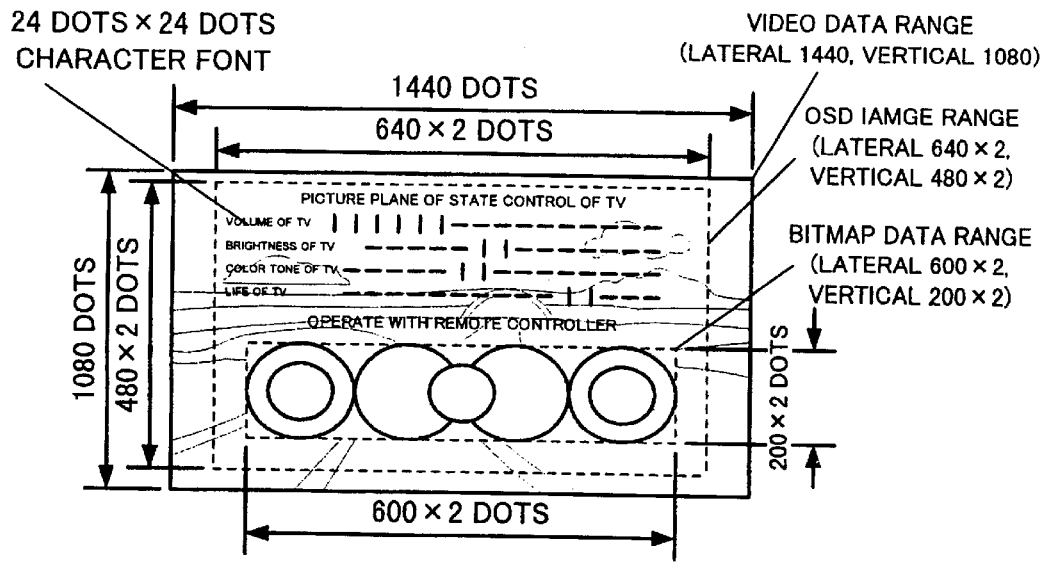
FIG. 10 is a schematic diagram for use in explanation of an OSD picture plane.
Figure 11:
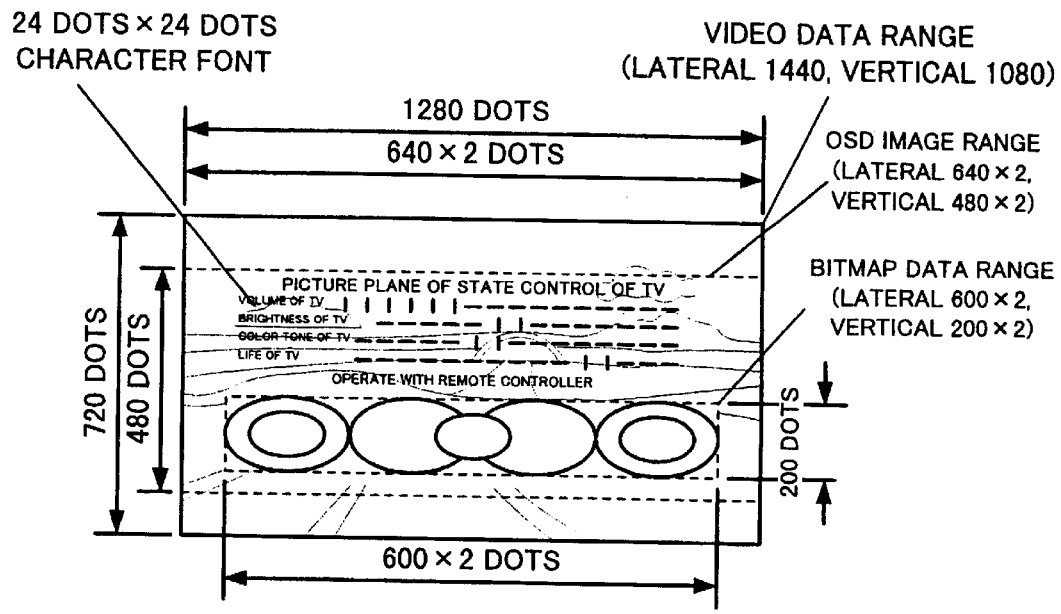
FIG. 11 is a schematic diagram for use in explanation of an OSD picture plane.
Figure 12:
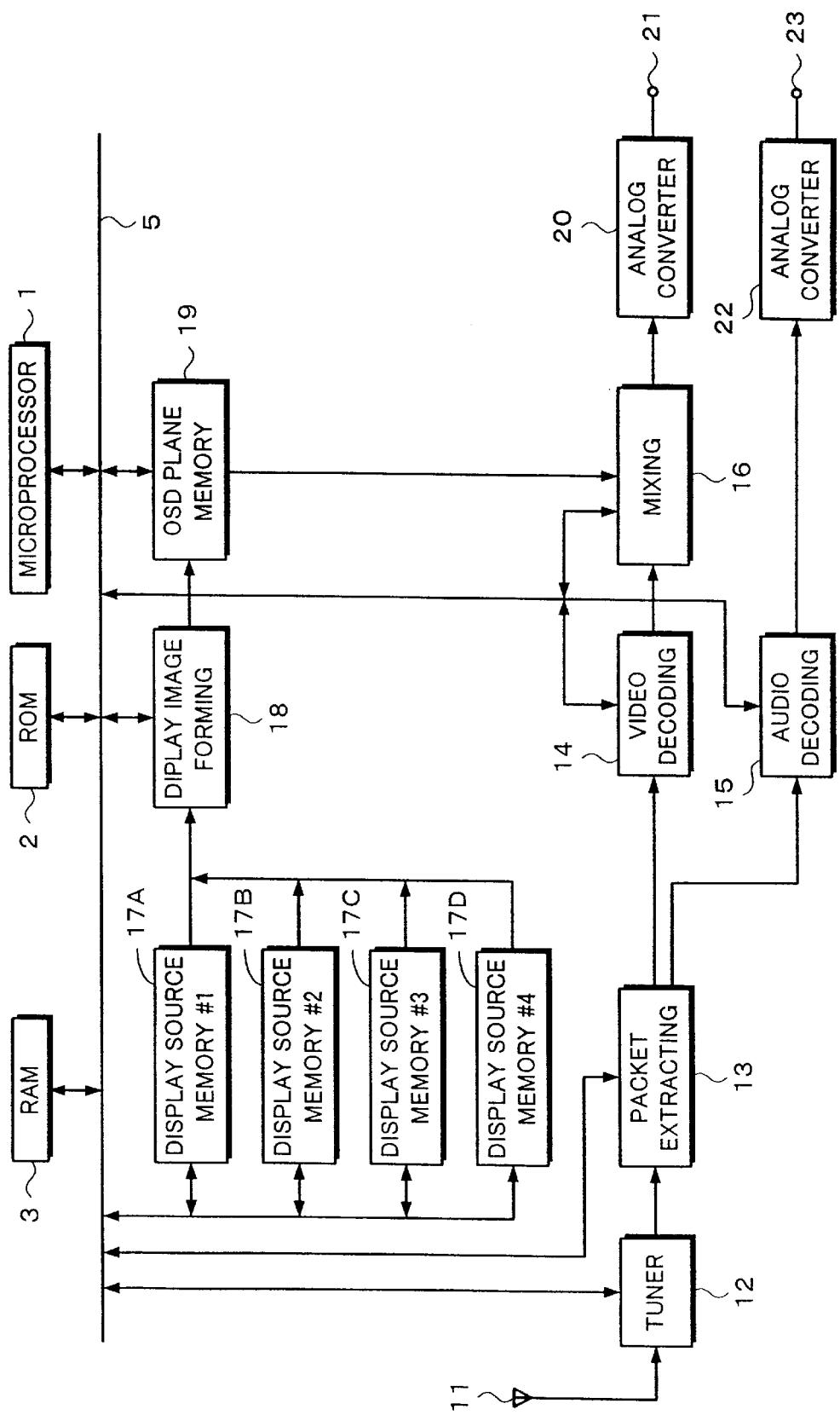
FIG. 12 is a block diagram showing an example of a construction of a television receiver to which the invention is applied.

An embodiment of the invention will now be described hereinbelow with reference to the drawings. FIG. 12 shows a receiver of a digital television broadcasting to which the invention is applied. In FIG. 12, a digital television broadcasting signal is received by an antenna 11. The reception signal from the antenna 11 is sent to a tuner circuit 12. A channel set signal is supplied from a microprocessor 1 to the tuner circuit 12.

The microprocessor 1 controls a processing system of the whole television receiver. A program ROM 2 to store a program to decide the operation and a work RAM 3 are provided for the microprocessor 1. A bus 5 led out from the microprocessor 1 is connected to a block of each section.

A reception channel is set in the tuner circuit 12 on the basis of the channel set signal from the microprocessor 1. In the tuner circuit 12, the signal of the selected reception channel is demodulated. A data stream of MPEG2 of the selected channel is outputted from the tuner circuit 12.

An output of the tuner circuit 12 is supplied to a packet extracting circuit 13. The packet extracting circuit 13 extracts a video packet and an audio packet of a specific program under the control of the microprocessor 1 with reference to a packet identifier (PID) of a packet header.

The video packet from the packet extracting circuit 13 is supplied to a video decoding circuit 14. The audio packet from the packet extracting circuit 13 is supplied to an audio decoding circuit 15.

The video decoding circuit 14 decompresses the video signal compressed by the MPEG2 system and decodes the digital video signal. Component digital video signals of, for example, Y, Cr, and Cb are outputted from the video decoding circuit 14. The component digital video signals are supplied to a mixing circuit 16.

To display the reception channel, a decoding state, and the like into a video picture plane, the mixing circuit 16 mixes the video signal and an OSD (On Screen Display) signal. For the purpose of such a picture plane display, display source memories 17A to 17D, a display source image forming circuit 18, and an OSD plane memory 19 are prepared.

Patterns of characters and images serving as sources of display picture planes have been held in the display source memories 17A to 17D in correspondence to the display picture planes of the image formats. Outputs of the display source memories 17A to 17D are supplied to the display image forming circuit 18.

The display image forming circuit 18 forms a display image by using display sources from the display source memories 17A to 17D. The formed display image is developed into the OSD plane memory 19 and held. The received video signal and the OSD signal from the OSD plane memory 19 are mixed in the mixing circuit 16.

A mixture ratio of the video signal and the OSD signal in the mixing circuit 16 is set by the microprocessor 1 by setting a mixture ratio of the digital video signal from the video decoding circuit 14 and the display image data of the OSD from the OSD plane memory 19 to a value α of 1 or less. As for the mixture ratio, for example, a case of mixing at five steps is considered. In case of a ratio of 100:0 or 0:100, it seems as if they were switched instead of the mixture.

An output of the mixing circuit 16 is supplied to an analog converter 20. The analog converter 20 converts the digital video signal into an analog video signal. The analog converter 20 converts the digital video signal formed by the mixing circuit 16 into an analog value. Usually, an A/D converter having a precision of 8 bits or 10 bits for each signal of the RGB signal format or the (Y, Cr, Cb) signal format is used. The analog video signal is outputted from an output terminal 21.

The audio packet from the packet extracting circuit 13 is sent to the audio decoding circuit 15. In the audio decoding circuit 15, the audio packet is converted into a digital audio signal. The digital audio signal has a precision of 16 bits or more. An output of the audio decoding circuit 15 is supplied to an analog converter 22. In the analog converter 22, the digital audio signal is converted into an analog audio signal. The analog audio signal is outputted from an output terminal 23.

As mentioned above, in the receiver of the digital television broadcasting to which the invention is applied, a plurality of display source memories (or patterns) 17A to 17D are prepared in correspondence to the image formats to be displayed, respectively.

That is, a character font set of a construction in which a display quality is held when an image of a resolution (vertical 1080 dots, horizontal 1920 dots) of the picture plane of the image format #1 is displayed on a CRT of 16:9 and a bit map constructed by a bit map image matched with the resolution have been stored in the display source memory 17A. A character font set in which a display quality is held when an image of a resolution (vertical 1080 dots, horizontal 1440 dots) of the picture plane of the image format #2 is displayed on a screen of 16:9 and a bit map image matched with the resolution have been stored in the display source memory 17B. A character font set in which a display quality is held when an image of a resolution (vertical 720 dots, horizontal 1280 dots) of the picture plane of the image format #3 is displayed on a screen of 16:9 and a bit map image matched with the resolution have been stored in the display source memory 17C. A character font set in which a display quality is held when an image of a resolution (vertical 480 dots, horizontal 720 dots) of the picture plane of the image format #4 is displayed on a screen of 16:9 and a bit map image matched with the resolution have been stored in the display source memory 17D.

Similar fonts and patterns with sizes such that a similar display quality is obtained in any image format have been stored in the display source memories 17A to 17D.

That is, for example, the font and bit map stored in the display source memory 17D are used as references, thereby enabling a similar display quality to be obtained in a similar pattern.

Since the resolution of the image format #4 is equal to (vertical 480 dots, horizontal 720 dots) and that of the image format #1 is equal to (vertical 1080 dots, horizontal 1920 dots), in the display source memory 17A, the resolution is set to a value that is 2.6 times as large in the lateral direction and is 2.25 times as large in the vertical direction. Since the resolution of the image format #2 is equal to (vertical 1080 dots, horizontal 1440 dots), in the display source memory 17B, the resolution is set to a value that is twice as large in the lateral direction and is 2.25 times as large in the vertical direction. Since the resolution of the image format #3 is equal to (vertical 720 dots, horizontal 1280 dots), in the display source memory 17C, the resolution is set to a value that is 1.8 times as large in the lateral direction and is 1.5 times as large in the vertical direction.

Therefore, for example, when the resolution of the display source memory 17D for the image format #4 is set to (lateral 600 dots, vertical 200 dots) and the user uses a font set of (lateral 24 dots, vertical 24 dots), the size of bit map of the display source memory 17A for the image format #1 is equal to (lateral 1600 dots, vertical 450 dots) and that of the font set is equal to (lateral 64 dots, vertical 54 dots). The size of bit map of the display source memory 17B for the image format #2 is equal to (lateral 1200 dots, vertical 450 dots) and that of the font set is equal to (lateral 48 dots, vertical 54 dots). The size of bit map of the display source memory 17C for the image format #3 is equal to (lateral 1066 dots, vertical 300 dots) and that of the font set is equal to (lateral 42 dots, vertical 36 dots).

In FIG. 12, upon reception, which image format the video packet extracted by the packet extracting circuit 13 has is detected by the video decoding circuit 14 on the basis of the data of the packet header. The decoded information is supplied to the display image forming circuit 18. Thus, the decoded information is converted into digital video data having the resolution decided in the image format on the basis of information in a payload of the inputted packet and is outputted as a digital video signal by the scan according to the format.

To form an OSD display image to be mixed into the video display image, the display image forming circuit 18 reads out specific characters or image pattern from the display source memories 17A to 17D corresponding to the image format under the decoding at present on the basis of the decoding information from the video decoding circuit 14 and combines it in response to an instruction of the microprocessor 1, thereby constructing an OSD display image and developing it into the OSD plane memory 19.

Figure 13:
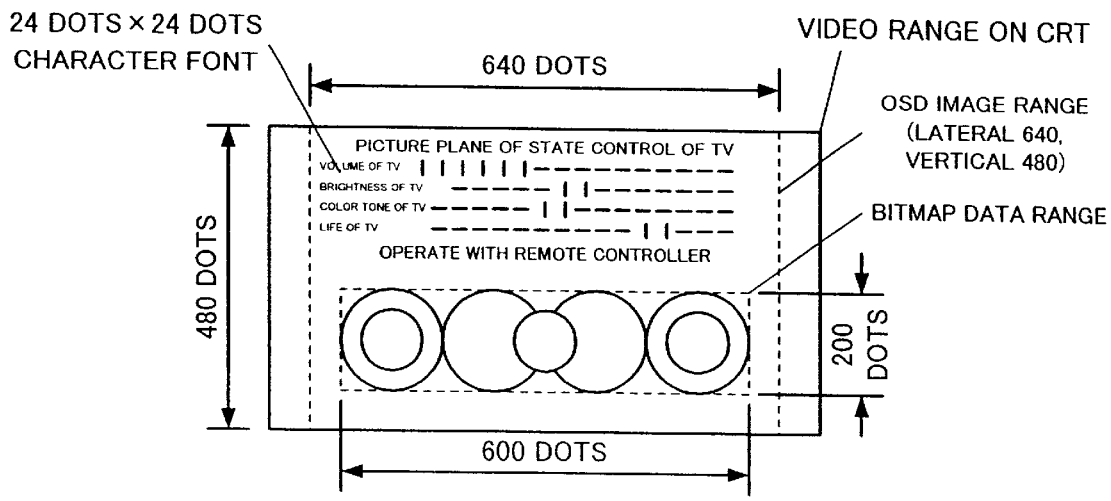
FIG. 13 is a schematic diagram for use in explanation of an example of the construction of the television receiver to which the invention is applied.

For example, when the video packet of the image format #4 is decoded by the video decoding circuit 14, the display image forming circuit 18 selects the display source memory 17D of the image format #4, reads out the font or bit map from the display source memory 17D, forms display image data as shown in FIG. 13 for the video display image area, and writes it into the OSD plane memory 19. In this instance, the display image forming circuit 18 determines and manages the kind of font or bit map to be read out or the position to display the read-out font or bit map in accordance with the image format under decoding and an internal operating state of the television receiver.

Figure 14:
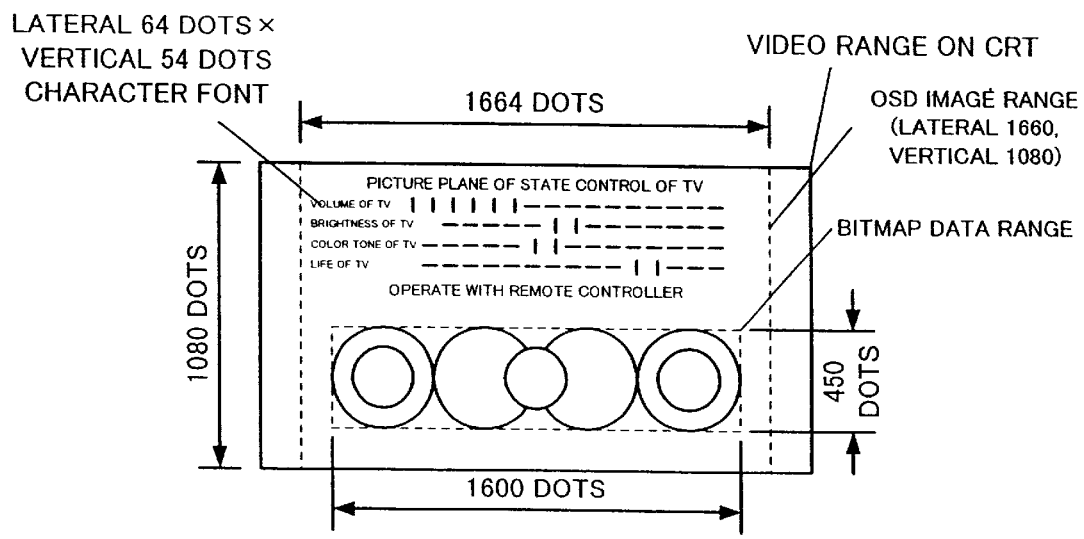
FIG. 14 is a schematic diagram for use in explanation of an example of the construction of the television receiver to which the invention is applied.

When the video packet of the image format #1 is decoded by the video decoding circuit 14, the display image forming circuit 18 selects the display source memory 17A of the image format #1, calls the font or bit map from the display source memory 17A, forms display image data as shown in, for example, FIG. 14, and writes it into the OSD plane memory 19. In this case, since an image is mixed and displayed onto the picture plane of the image format #1 by using the font or bit map stored in the display source memory 17A, as shown in FIG. 14, the image is displayed by the pattern, size, and resolution similar to those in case of FIG. 13.

Similarly, when the video packet of the image format #2 is decoded by the video decoding circuit 14, the display image forming circuit 18 selects the display source memory 17B. When the video packet of the image format #3 is decoded by the video decoding circuit 14, the display image forming circuit 18 selects the display source memory 17C. The font or bit map is read out from the selected display source memory and written into the OSD plane memory 19.

As mentioned above, in the television receiver to which the invention is applied, the display source memories 17A to 17D according to the image formats are prepared. The image format is determined from the extracted video packet. The font or bit map is read out from one of the display source memories 17A to 17D corresponding to the image format and displayed. Thus, the characters or bit map picture plane at similar quality and size can be always seen irrespective of the received image format.

Although the display image forming circuit 18 can be realized by hardware, when a status transition of the television receiver is complicated, it can be realized by processes of software in the microprocessor 1. Even when the video decoding circuit 14 decodes a format other than the above-mentioned image formats, the invention can cope with such a case by merely adding a display source memory.

According to the invention, the image display memory to form the OSD display image that is optimum to the video data is prepared for every image format. Therefore, even when the signal of any image format is received, the OSD picture plane of a similar quality can be obtained. A situation such that the display aspect ratio of the OSD image is changed and the OSD image is distorted is eliminated.

Since the OSD display image that is optimum to the video data has been accumulated in each image display memory for every image format, there is no need to change the reading rate from the OSD plane memory in accordance with the image format. There is no need to endure the video data.

The present invention is not limited to the foregoing embodiment but many modifications and variations are possible within the spirit and scope of the appended claims of the invention.

What is claimed is:

1. A television receiver for receiving a plurality of formats of video signals having different resolutions, comprising:
   resolution discriminating means for discriminating a resolution of the received video signal;
   a source memory in which a plurality of display patterns of additional video image constructed by characters and/or figures have been recorded by an amount of said corresponding plural video signal formats;
   display image forming means for reading out the display patterns in said source memory, constructing a display image, and transferring said display image to a display memory; and
   a mixing circuit for mixing the display image read out from said display memory and the received video signal,
   wherein one of display patterns of the corresponding resolution is selected from said source memory in accordance with the resolution of the received video signal determined by said resolution discriminating means, the display image is constructed from said selected display pattern, said display image is superimposed onto said received video signal, and a resultant image is displayed.

2. A receiver according to claim 1, wherein said resolution discriminating means detects the resolution from information included in a header of a packet of the received digital video signal.

3. A receiver according to claim 1, wherein at least one of said received video signals includes a digital signal.

4. A receiver according to claim 1, wherein at least one of said received video signals includes a signal compressed by an MPEG system.

5. A receiver according to claim 1, wherein at least one of said received video signals includes a signal transmitted by a noninterlace system.

6. A television receiver for receiving video signals of a plurality of formats of different aspect ratios of images, comprising:

discriminating means for discriminating the aspect ratio of the received video signal;

a source memory in which display patterns of additional video images constructed by characters or figures have been recorded by an amount corresponding to a plurality of patterns at aspect ratios corresponding to said video signals of said plurality of formats of said different aspect ratios;

display image forming means for reading out one of the display patterns in said source memory, constructing a display image, and transferring said display image to a display memory; and a mixing circuit for synthesizing the display image read out from said display memory and the received or inputted video signal on a picture plane, wherein a corresponding one of said plurality of display patterns is selected in accordance with the aspect ratio of the video signal determined by said discriminating means, the display image is constructed from the selected display pattern, said display image is synthesized to said received or inputted video signal, and a resultant image is displayed.

* * * * *